United States Patent
Satish et al.

(10) Patent No.: US 7,552,477 B1
(45) Date of Patent: Jun. 23, 2009

(54) DETECTING RETURN-TO-LIBC BUFFER OVERFLOWS VIA DYNAMIC DISASSEMBLY OF OFFSETS

(75) Inventors: Sourabh Satish, Fremont, CA (US); Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 857 days.

(21) Appl. No.: 11/064,712

(22) Filed: Feb. 23, 2005

(51) Int. Cl.
G06F 12/16 (2006.01)
G06F 13/24 (2006.01)
(52) U.S. Cl. .......................... 726/22; 710/260
(58) Field of Classification Search ........................ None
See application file for complete search history.

(56) References Cited

U.S. PATENT DOCUMENTS 6,301,699 B1 * 10/2001 Hollander et al. ........... 717/131
2005/0102493 A1 * 5/2005 DeWitt et al. ............... 712/227

OTHER PUBLICATIONS

Satish et al., "Detecting Buffer Overflows Using Frame Pointer Characteristics", U.S. Appl. No. 11/095,276, filed Mar. 30, 2005.
Salinas et al., "Method to Identify Buffer Overflows and RLIBC Attacks", U.S. Appl. No. 11/176,855, filed Jul. 6, 2005.

* cited by examiner

Primary Examiner—Nasser G Moazzami
Assistant Examiner—Brandon S Hoffman
(74) Attorney, Agent, or Firm—Gunnison, McKay & Hodgson, L.L.P.; Philip J. McKay

(57) ABSTRACT

A method makes use of the fact that call modules, such as APIS, making calls to a critical operating system (OS) function are typically called by a call instruction while, in contrast, a RLIBC attack typically uses call modules that are jumped to, returned to, or invoked by some means other than a call instruction. The method includes stalling a call to critical OS function and checking to ensure that the call module making the call to the critical OS function was called by a call instruction. If it is determined that the call module making the call to the critical OS function was not called by a call instruction, the method further includes taking protective action to protect a computer system.

13 Claims, 5 Drawing Sheets

DETECTING RETURN-TO-LIBC BUFFER OVERFLOWS VIA DYNAMIC DISASSEMBLY OF OFFSETS

BACKGROUND

1. Field

The present invention relates to the protection of computer systems. More particularly, the present invention relates to a system and method of blocking Return-to-LIBC attacks.

2. Description of Related Art

Buffer overflow techniques have often been used by malicious hackers and virus writers to attack computer systems. Buffers are data storage areas that typically hold a predefined finite amount of data. A buffer overflow occurs when a program attempts to store more data into a buffer than the buffer can accommodate, i.e., the program attempts to store more than the predefined finite amount of data. One category of buffer overflow, sometimes called stack-based buffer overflow, involves overwriting stack memory, sometimes called the stack. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly change the execution flow and instructions.

In the case of a Return-to-LIBC attack, hereinafter also referred to as a RLIBC attack, the attacker overflows the stack in such a way that a return address will be replaced to point to a library function in a loaded library inside the process address space. Thus, when the return address is used by the overflowed process, a library function will be executed. This way the attacker runs at least one call module, such as an Application Programming Interface (API), to make operating system function calls and run a command shell on the compromised system remotely.

SUMMARY OF THE INVENTION

A method according to one embodiment of the invention makes use of the fact that non-malicious call modules, such as Application Programming Interfaces (APIs), making calls to critical operating system (OS) functions are typically initiated by call instructions, i.e. are "called" by call instructions, and, in contrast, a RLIBC attack typically uses call modules that are not called by a call instruction, but are jumped to, returned to, or invoked by some instruction or means other than a call instruction.

According to the present invention, a method includes stalling a call to a critical OS function and checking to ensure that the call module making the call to the critical OS function, also called an initiating call module, was called by a call instruction. If it is determined that the call module was not called by a call instruction, the method further includes taking protective action to protect the computer system.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

In the following discussion call instructions are defined as instructions used to invoke a routine or function in a programming language. Calling a routine or function consists of specifying the routine or function name and, optionally, parameters. Calling a routine or function is referred to herein as the routine or function being "called" or "called by a call instruction". As an example, in a Windows® NT and Windows® 2000 environment the instruction "CALL" is a call instruction.

In addition, in the following discussion, a call module includes operating system function call instruction(s), i.e., the instruction or set of instructions that originates a call to an operating system function. Herein, the process whereby a call module originates a call to an operating system function is referred to as a "call to" an operating system function and the call module making a call to an operating system function, or a critical operating system function, is referred to a an "initiating call module". Call modules may be malicious or non-malicious. A parent application may include the call module, or, the parent application may itself be a call module.

In addition, in the following discussion, an opcode byte value is a number, such as E8 or FF, represented by digital bits, which, when read by a processor, indicates to the processor a specific action. For instance, as used herein, a call instruction opcode byte value is a number that when read by the processor indicates to the processor that a call is to be performed.

In addition, as used herein, an opcode format, or opcode specific format, refers to the specific addressing mode and specific positioning of data within a specific opcode scheme including offsets, or opcode format specific offsets, where offsets are bit or byte displacements between elements such as an opcode byte value and an address. For instance, in one addressing mode of the E8 opcode format, the call instruction opcode byte value (E8) is followed by a 1-byte offset and then the return address. As another example, one addressing mode of the FF02/FF03 format includes the call instruction opcode byte value (FF) followed directly by the return address.

A method according to one embodiment of the invention makes use of the fact that non-malicious call modules, such as Application Programming Interfaces (APIs), making calls to critical operating system (OS) functions, i.e., initiating call modules, are typically called by call instructions and, in contrast, a RLIBC attack typically uses call modules that are not called by a call instruction, but are jumped to, returned to, or invoked by some means other than a call instruction.

Figure 2:
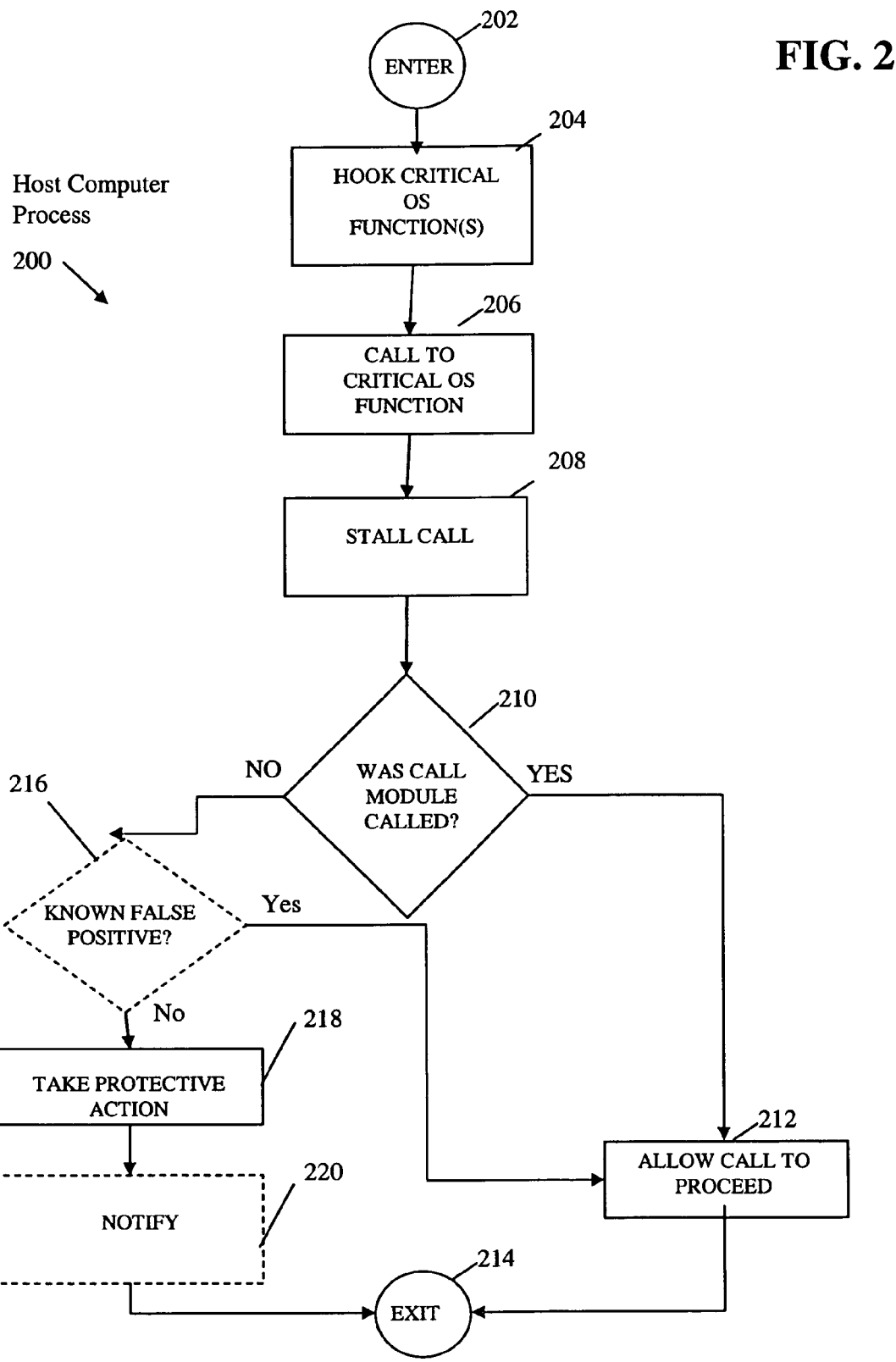
FIG. 2 is a flow diagram of a host computer process in accordance with one embodiment of the present invention.

Referring briefly to FIG. 2, according to the present invention, a method includes hooking critical OS functions (HOOK CRITICAL OS FUNCTION(S) OPERATION 204 in FIG. 2), stalling calls to critical OS functions (STALL CALL 208 in FIG. 2) and checking to ensure that the initiating call modules were called by a call instruction (WAS CALL MODULE CALLED 210 in FIG. 2). If it is determined that an initiating call module was not called by a call instruction, the method further includes taking protective action to protect the computer system (TAKE PROTECTIVE ACTION OPERATION 218 in FIG. 2).

Figure 4A:
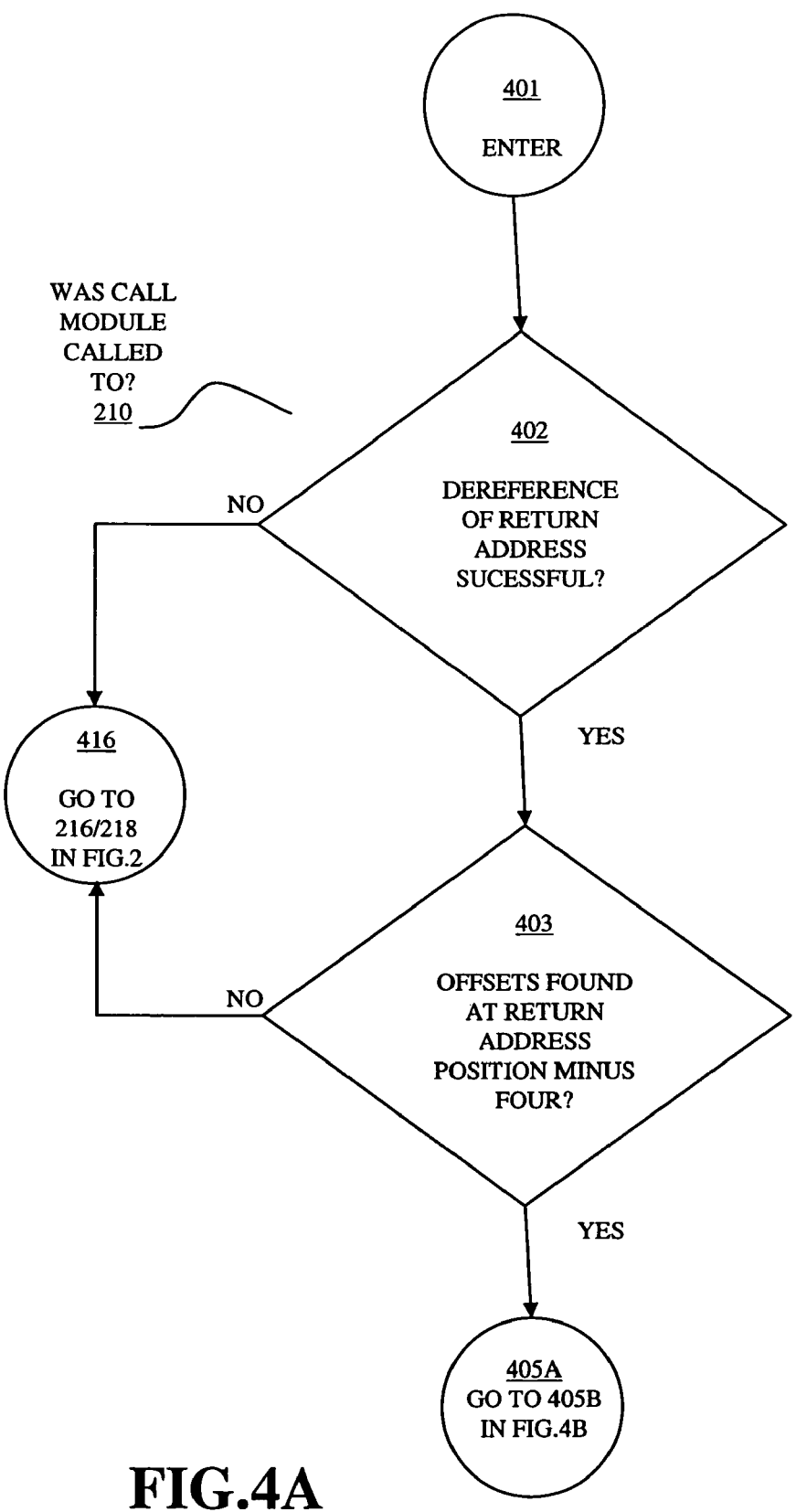
FIG. 4A and FIG. 4B are a flow diagram of one embodiment of WAS CALL MODULE CALLED? OPERATION of the host computer process of FIG. 2 in accordance with one embodiment of the present invention.
Figure 4B:
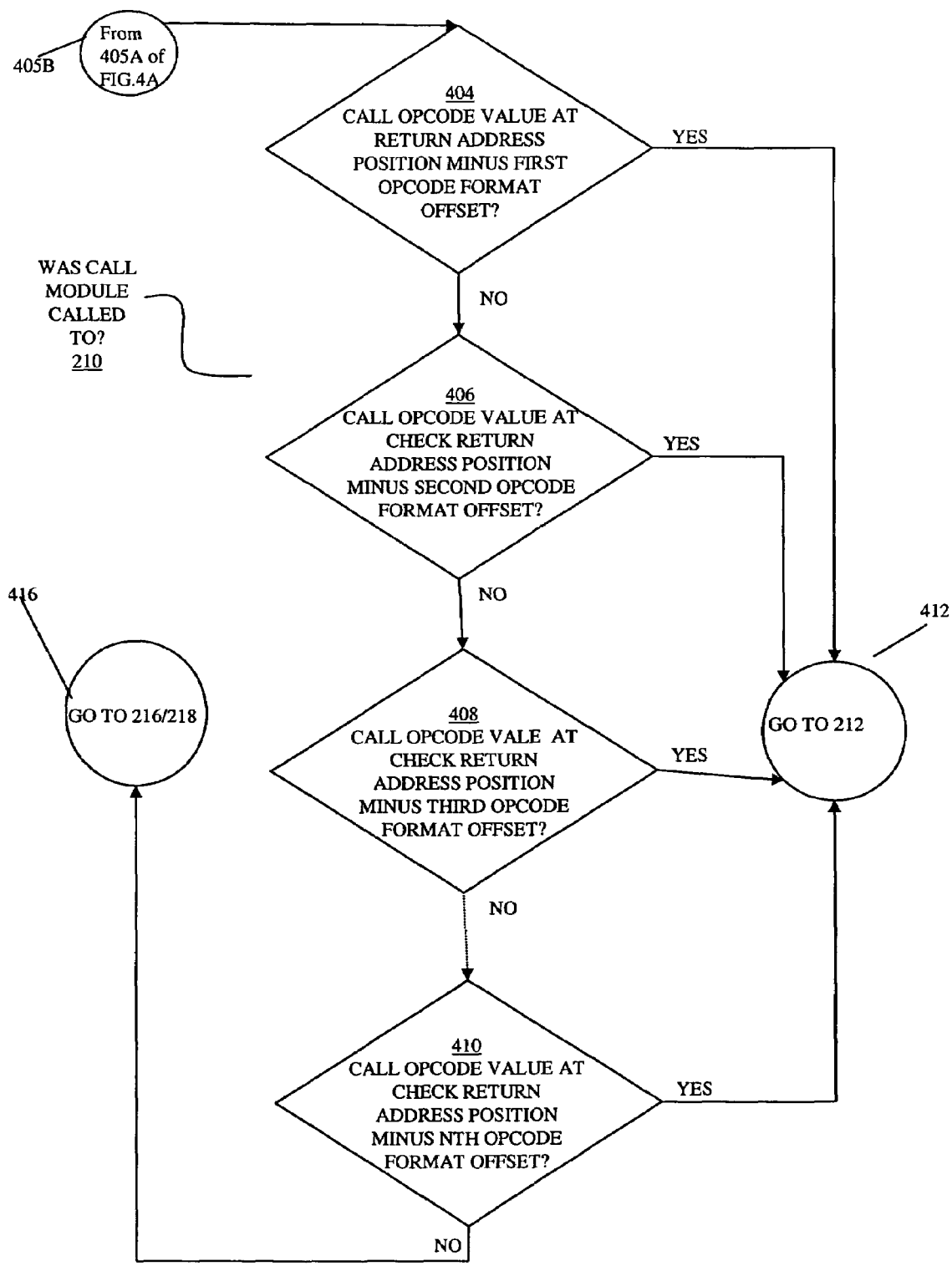

Referring briefly to FIGS. 4A and 4B, according to one embodiment of the present invention, a dereference of the return address from the prologue hook is attempted (DEREFERENCE OF RETURN ADDRESS SUCESSFUL? OPERATION 402 in FIG. 4A). If the dereference is successful, then the present return address may be a valid address. If, on the other hand, a dereference of the return address is not successful, according to one embodiment of the invention, the call module, and the call to the critical OS function from the call module, are considered suspect and the method of the invention further includes taking action to protect the computer system (416 in FIG. 4A and TAKE PROTECTIVE ACTION OPERATION 218 in FIG. 2).

According to one embodiment of the present invention, if a dereference of the return address is successful, the position of the return address of the initiating call module minus four bytes, also sometimes simply called ReturnAddress-4, in the code page of the initiating call module is inspected for offsets (OFFSETS FOUND AT RETURN ADDRESS POSITION MINUS FOUR? OPERATION 403 in FIG. 4A). Offsets at ReturnAddress-4 are found for a specific address mode of the call function only if the call module has been called by an FF02-FF03 instruction. Consequently, if offsets at ReturnAddress-4 are not found, according to one embodiment of the invention, the call module, and the call to the critical OS function from the call module, are considered suspect and the method of the invention further includes taking action to protect the computer system (416 IN FIG. 4A).

According to one embodiment of the present invention, if offsets at ReturnAddress-4 are found, (405A in FIG. 4A/405B IN FIG. 4B) the byte value at the position of the return address of an initiating call module minus an opcode format specific offset is examined to determine whether the initiating call module has been called by the call instruction opcode byte value associated with the opcode format that employs the opcode format specific offset (CALL OPCODE VALUE AT RETURN ADDRESS POSITION MINUS FIRST OPCODE FORMAT OFFSET? OPERATION 404 in FIG. 4). According to one embodiment of the present invention, the process is repeated for each known opcode format, opcode byte value, and opcode format specific offset associated with a call instruction (CALL OPCODE VALUE AT RETURN ADDRESS POSITION MINUS SECOND OPCODE FORMAT OFFSET? OPERATION 406, CALL OPCODE VALUE AT RETURN ADDRESS POSITION MINUS THIRD OPCODE FORMAT OFFSET? OPERATION 408, and CALL OPCODE VALUE AT RETURN ADDRESS POSITION MINUS NTH OPCODE FORMAT OFFSET? OPERATION 410 in FIG. 4). According to one embodiment of the present invention, if the byte value at the position of the return address of a initiating call module minus any of the opcode format specific offsets produces the proper call instruction opcode byte value, then the test is considered indeterminate due to the possibility of "false positive" results, i.e., the byte value at the position of the return address of the initiating call module minus the opcode format specific offset can be the call instruction opcode byte value by pure coincidence (412 in FIG. 4). If, on the other hand, the byte value at the position of the return address of the initiating call module minus all of the opcode format specific offsets fails to produce a proper call instruction opcode byte value, then it is determined that the initiating call module was not called by a call instruction and the method further includes taking protective action to protect the computer system (414 in FIG. 4).

Figure 1:
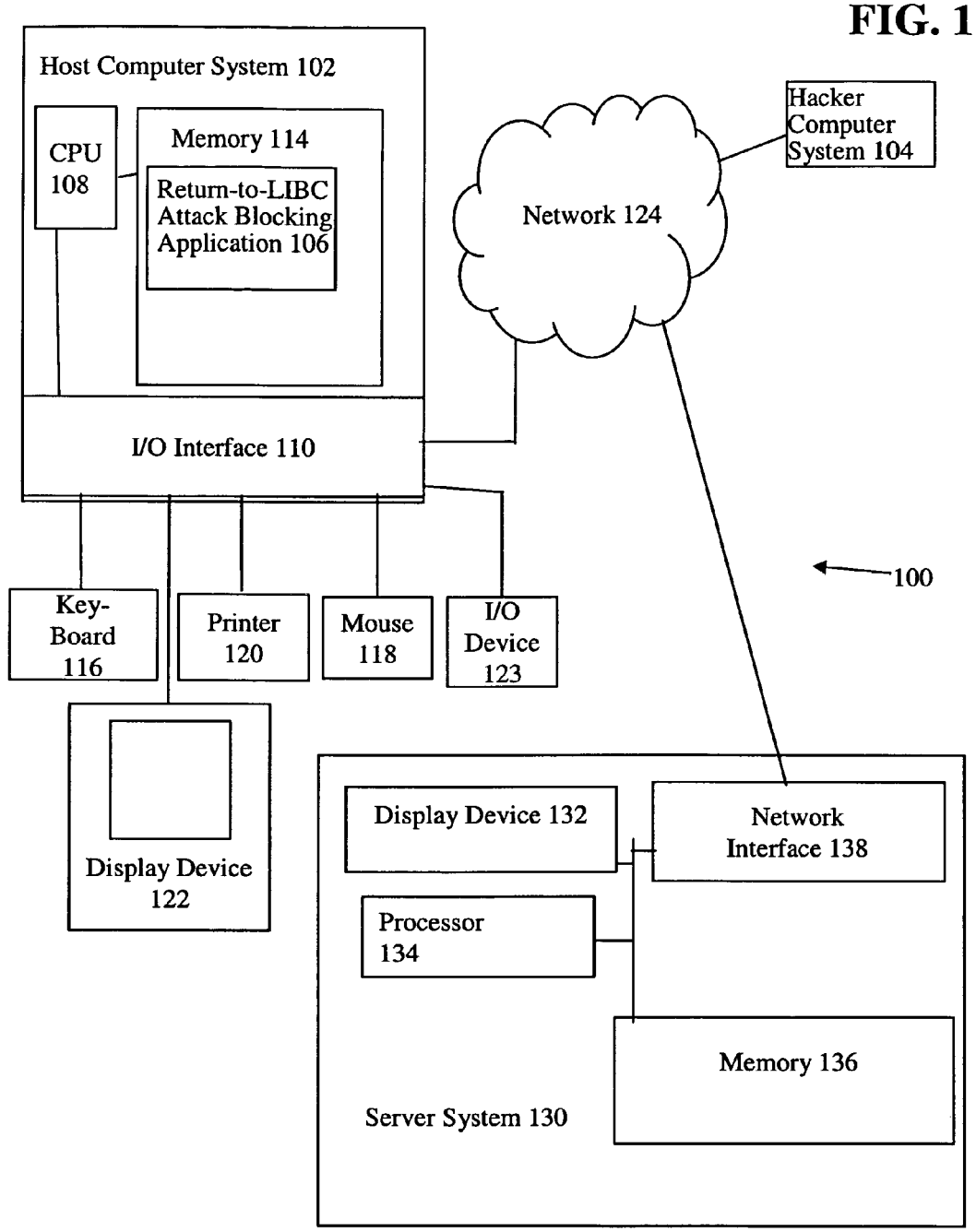
FIG. 1 is a diagram of a client-server system that includes a Return-to-LIBC attack blocking application executing on a host computer system in accordance with one embodiment of the present invention.

More particularly, FIG. 1 is a diagram of a client-server system 100 that includes a Return-to-LIBC attack blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, memory 114 includes a page based virtual memory system that uses pages, e.g., memory areas.

For example, Windows® NT and Windows® 2000 are 32-bit operating systems widely used on home and business computer systems. Windows® NT and Windows® 2000 provide page-based virtual memory management schemes that permit programs to realize a 4 GB (gigabyte) virtual memory address space. In one embodiment, when processor 108 is running in virtual memory mode, all addresses are assumed to be virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disk drives and network connections, user mode programs utilize system calls, sometimes called operating system (OS) function calls, which interface between the user mode and kernel mode functions.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, Return-to-LIBC attack blocking application 106 is loaded into host computer system 102 via I/O device 123, such as from a CD, DVD or floppy disk containing Return-to-LIBC attack blocking application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102 and, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principals of the invention.

Network 124 can be any network or network system that is of interest to a user. In various embodiments, network interface 138 and I/O interface 110 include analog modems, digital modems, or a network interface card.

In one embodiment of the invention, Return-to-LIBC attack blocking application 106 is typically stored in memory 114 of host computer system 102 and executed on host computer system 102. The particular type, and configuration, of host computer system 102, hacker computer system 104, and server system 130 are not essential to the present invention.

As discussed above, a method according to one embodiment of the invention makes use of the fact that a non-malicious call module, such as an Application Programming Interface (API), making calls to critical OS functions, also called an initiating call module, is typically called by a call instruction while, in contrast, a RLIBC attack typically uses call modules that are jumped to, returned to, or invoked by some means other than a call instruction. Consequently, according to one embodiment of the invention, if it is determined that the initiating call module was not called by a call instruction, the method further includes taking protective action to protect host computer system 102.

FIG. 2 is a flow diagram of a host computer process 200 in accordance with one embodiment of the present invention. Referring now to FIGS. 1 and 2 together, in one embodiment of the invention, execution of Return-to-LIBC attack blocking application 106 by processor 108 results in the operations of host computer process 200 as described below.

From an ENTER OPERATION 202, flow moves to a HOOK CRITICAL OS FUNCTION(S) OPERATION 204. In HOOK CRITICAL OS FUNCTION(S) OPERATION 204, the critical operating system (OS) functions, e.g., at least one critical OS function, of host computer system 102 is/are hooked. In one embodiment, a system level, e.g., a kernel mode module or kernel mode driver, hooks the critical OS functions. Further, in one embodiment, a critical OS function is hooked by redirecting calls to the critical OS function to a hook module.

In one embodiment of the invention, an OS function is deemed critical if it is necessary for a first application, e.g., a parent application, to cause execution of a second application, e.g., a child application. In one particular embodiment, an OS function is deemed critical if it is necessary, or likely, to be used by a malicious parent application, e.g., an application which contains, or uses, malicious code, e.g., located on the stack, to execute a child application, where the child application allows remote access, e.g., remote system level access. Examples of child applications include the command prompt or "cmd.exe" on a Windows® operating system and "/bin/sh" on a UNIX or UNIX like, e.g., FreeBSD or MacOS x, operating system. As used herein, a child application is not dependent upon a parent application, i.e., once the child application is executed the parent application can be terminated without termination of the child application.

In one embodiment of the invention, typically run on a Windows® operating system, the CreateProcess( ) and System( ) are deemed critical OS functions. In yet another embodiment, critical OS functions are located in the C-library hence the name "Return-to-LIBC" attack.

As is well known to those of skill in the art, System calls expose all kernel functionality that user-mode programs require. User-mode programs need to utilize the functionality provided by the kernel, for example, to access disk drives, network connections, and shared memory. More particularly, because the processor prevents direct access to kernel mode functions by user-mode programs, user-mode programs use System calls, which form the only permitted interface between user-mode and kernel mode. In accordance with one embodiment of the invention, System calls include calls to critical OS functions and calls to non-critical OS function.

From HOOK CRITICAL OS FUNCTION(S) OPERATION 204, flow moves to a CALL TO CRITICAL OS FUNCTION OPERATION 206. In CALL TO CRITICAL OS FUNCTION OPERATION 206, a call to, sometimes called a call to critical OS function, or a critical OS function call, invoking a critical OS function is made by a call module of a parent application, also called an initiating call module. The parent application, and/or the initiating call module, may be malicious or non-malicious. More particularly, a call to a critical OS function is made by a initiating call module of a parent application to an OS function that was hooked in HOOK CRITICAL OS FUNCTION(S) OPERATION 204.

In accordance with one embodiment of the present invention, a call module includes the critical OS function call instruction(s), i.e., the instruction or set of instructions that originates the call to a critical OS function. Herein, the process whereby a call module originates a call to an operating system function is referred to as a "call to" an operating system function and the call module making a call to an operating system function, or a critical operating system function, is referred to a an initiating call module. The initiating call module may be malicious or non-malicious. The parent application may include the call module, or, in one embodiment, the parent application is the call module.

From CALL TO CRITICAL OS FUNCTION OPERATION 206, flow moves to a STALL CALL OPERATION 208. In STALL CALL OPERATION 208, the call to a critical OS function of CALL TO CRITICAL OS FUNCTION OPERATION 206 is stalled, i.e., is prevented from reaching the operating system. By stalling the call to the critical OS function, execution of the critical OS function is stalled.

From STALL CALL OPERATION 208, flow moves to a WAS CALL MODULE CALLED? OPERATION 210. In WAS CALL MODULE CALLED? OPERATION 210, a determination is made as to whether the initiating call module was called by a call instruction. If a determination is made in WAS CALL MODULE CALLED? OPERATION 210 that the initiating call module was indeed called by a call instruction, flow moves an ALLOW CALL TO PROCEED OPERATION 212.

In ALLOW CALL TO PROCEED OPERATION 212, the call to the critical OS function is allowed to proceed. More particularly, the call to the critical OS function is passed to the operating system. As discussed above, the call to the critical OS function was stalled in STALL CALL OPERATION 208. From ALLOW CALL TO PROCEED OPERATION 212, flow moves to an EXIT OPERATION 214, or waits for the next call to a critical OS function and returns to CALL TO CRITICAL OS FUNCTION OPERATION 206.

In one embodiment of the invention, malicious code is defined as any computer program, module, set of modules, or code that enters a computer system without an authorized user's knowledge and/or without an authorized user's consent. In a typical, i.e., non-malicious, operation, an initiating call module is called by a call instruction. However, a determination at WAS CALL MODULE CALLED? OPERATION 210 that the initiating call module being checked has been called by a call instruction does not necessarily mean that the initiating call module is not malicious code. This is because of the possibility of "false positive" results. Specific "false positive" results are discussed in more detail below.

Consequently, a "YES" determination at WAS CALL MODULE CALLED? OPERATION 210, indicating that the initiating call module being checked has been called by a call instruction is, according to one embodiment of the invention, considered an indeterminate result and, in one embodiment of the invention, flow would proceed to ALLOW CALL TO PROCEED OPERATION 212, then to EXIT OPERATION 214, and then on to another test, or tests, (not shown) to try and make a more conclusive determination about the call to the critical OS function.

On the other hand, if a determination is made at WAS CALL MODULE CALLED? OPERATION 210 that the initiating call module was not called by a call instruction, i.e. the results at WAS CALL MODULE CALLED? OPERATION 210 are "NO", the initiating call module, and the critical OS function call itself, become suspect, the method of the invention further includes taking action to protect host computer system 102 in FIG. 1, and flow moves in FIG. 2, optionally, to a KNOWN FALSE POSITIVE? OPERATION 216 (or directly to a TAKE PROTECTIVE ACTION OPERATION 218, if KNOWN FALSE POSITIVE? OPERATION 216 is not performed).

In KNOWN FALSE POSITIVE? OPERATION 216, a determination is made as to whether the call to a critical OS function is a known "false positive". A known "false positive" call to a critical OS function is a call to a critical OS function that triggers a "NO" result at WAS CALL MODULE CALLED? OPERATION 210, but is, in fact, safe, i.e., is not associated with malicious code. Illustratively, a user-defined or downloadable exclusion and/or inclusion list is used to determine whether the call to a critical OS function is a known "false positive".

If a determination is made in KNOWN FALSE POSITIVE? OPERATION 216 that the call to a critical OS function is a known "false positive" call to a critical OS function, flow moves to ALLOW CALL TO PROCEED OPERATION 212, which is performed as discussed above, and EXIT OPERATION 214. Conversely, if a determination is made at KNOWN FALSE POSITIVE? OPERATION 216 that the call to a critical OS function is not a known "false positive" call to a critical OS function, flow moves to a TAKE PROTECTIVE ACTION OPERATION 218.

In TAKE PROTECTIVE ACTION OPERATION 218, protective action is taken to prevent the malicious code of, or used by, the initiating call module from causing damage to, or exploiting, host computer system 102 in FIG. 1. For example, the call to a critical OS function is terminated. More particularly, the call to a critical OS function is not passed to the operating system but is terminated. As discussed above, the call to a critical OS function was stalled in STALL CALL OPERATION 208 in FIG. 2.

By terminating the call to a critical OS function, the malicious code of the call module is prevented from exploiting and/or damaging host computer system 102 in FIG. 1. In one embodiment, by terminating the call to a critical OS function, the child application is prevented from being executed. By preventing execution of the child application, remote access is denied, thus preventing unauthorized access by malicious hackers as well as by replicating malware, e.g., worms.

As discussed above, if a determination is made in WAS CALL MODULE CALLED? OPERATION 210 that the initiating call module was not called by a call instruction, i.e. the results at WAS CALL MODULE CALLED? OPERATION 210 are "NO", the initiating call module, as well as the critical OS function call itself, become suspect. By terminating the call to a critical OS function, the critical OS function is prevented from being executed. As another example of protective action, the parent application, including the call module and/or a malicious thread running within the context of the parent application, is terminated. Termination of applications is well known to those of skill in the art and so is not discussed further for clarity of discussion.

Returning to FIG. 2, flow moves from TAKE PROTECTIVE ACTION OPERATION 218, optionally, to a NOTIFY OPERATION 220 (or directly to EXIT OPERATION 214, if NOTIFY OPERATION 220 is not performed). In NOTIFY OPERATION 220, the user of host computer system 102 in FIG. 1, and/or the administrator, are notified that protective action has been taken on host computer system 102, e.g., that a call, a parent application and/or a call module have been terminated. The user and/or administrator can be notified using any one of a number of techniques, e.g., by using a pop up window, by generating an e-mail, by writing to a file and/or otherwise by logging the event. Further, a notification can be provided to a security center.

From NOTIFY OPERATION 220 in FIG. 2, flow moves to EXIT OPERATION 214 or waits for the next call to a critical OS function and returns to CALL TO CRITICAL OS FUNCTION OPERATION 206.

Figure 3:
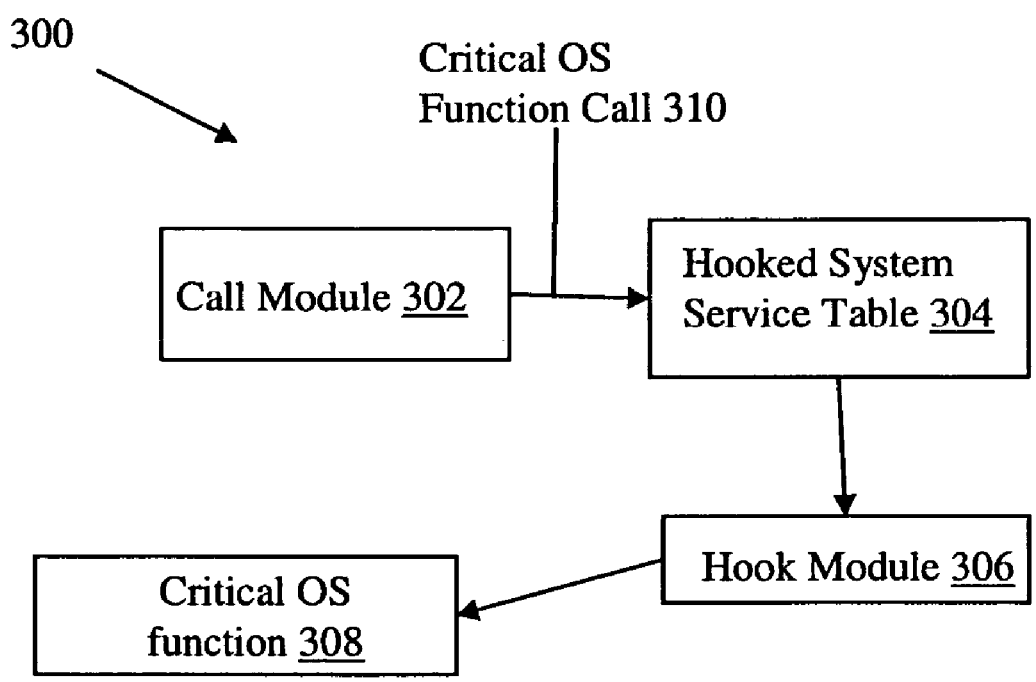
FIG. 3 is a diagram of a hooked operating system function call flow in accordance with one embodiment of the present invention.

FIG. 3 is a diagram of a hooked operating system function call flow 300 in accordance with one embodiment of the present invention. Referring now to FIGS. 2 and 3 together, a hook module 306 is used to hook calls to a critical OS function 308. In one embodiment, HOOK CRITICAL OS FUNCTION (S) OPERATION 204 is implemented using hook module 306, which is part of Return-to-LIBC blocking application 106 (FIG. 1).

More particularly, in FIG. 3, a hooked system service table 304 routes calls to non-critical OS functions directly to the operating system (not shown). However, hooked system service table 304 routes calls to critical OS functions to hook module 306, e.g., a kernel mode module or kernel mode driver.

As is well known to those of skill in the art, a system service table, sometimes called a dispatch table or a system call table, relates system calls to specific addresses within the operating system kernel. Hooked system service table 304 in accordance with one embodiment of the present invention, redirects calls to critical OS functions to hook module 306 and from the specific addresses within the operating system kernel to which the calls to critical OS functions would otherwise be directed.

Although FIG. 3 describes one example of a hooked operating system function call path, in light of this disclosure, those of skill in the art will understand that other techniques can be used to hook operating system function(s). The particular technique used depends, for example, on the particular operating system.

In one embodiment, hook module 306 is used to stall a call to a critical OS function during STALL CALL OPERATION 208 of FIG. 2. Further, hook module 306 continues to stall calls to the critical OS function during WAS CALL MODULE CALLED? OPERATION 210, and KNOWN FALSE POSITIVE? OPERATION 216, if performed. Hook module 306 allows the calls to a critical OS function to proceed to the operating system and thus to critical OS function 308 during ALLOW CALL TO PROCEED OPERATION 212. Conversely, hook module 306 terminates the call to a critical OS function and/or takes other protective action during TAKE PROTECTIVE ACTION OPERATION 218.

In accordance with this embodiment of the invention, a call to a critical OS function 310 originates from a call module 302 during CALL TO CRITICAL OS FUNCTION OPERATION 206. Critical OS function call 310 is routed by hooked system service table 304 to hook module 306. Critical OS function call 310 is stalled by hook module 306 in STALL CALL OPERATION 208.

Hooking and hooking operations are well known to those of skill in the art. Consequently, a more detailed discussion of hooking and hooking operations is omitted here to avoid detracting from the present invention.

Returning to FIG. 2, as discussed above, if a determination is made in WAS CALL MODULE CALLED? OPERATION 210 that the initiating call module was not called, i.e. the results at WAS CALL MODULE CALLED? OPERATION 210 are "NO", the initiating call module becomes suspect.

As is well known to those of skill in the art, in Complex Instruction Set Computer (CISC) systems, there are several opcode formats, or different addressing modes, that can yield the same result. For instance, a call instruction can be in the E8 format or the FF02/FF03 format where E8 and FF represent the byte value of the call instruction opcode.

As is also well known to those of skill in the art, an opcode byte value is a number, represented by digital bits, which, when read by a processor, indicates to the processor a specific action. For instance, as used herein, a call instruction opcode byte value is a number that when read by the processor indicates to the processor that a call is to be performed.

Each opcode format has an associated offset, as used herein, an opcode format, or opcode specific format, refers to the specific addressing mode and specific positioning of data within a specific opcode scheme including offsets, or opcode format specific offsets, where offsets are bit or byte displacements between elements such as an opcode byte value and an address. For instance, in one addressing mode of the E8 opcode format, the call instruction opcode byte value (E8) is followed by a 1-byte offset and then the return address. As another example, one addressing mode of the FF02/FF03 format includes the call instruction opcode byte value (FF) followed directly by the return address.

According to one embodiment of the invention, WAS CALL MODULE CALLED? OPERATION 210 of host computer process 200 of FIG. 2 determines whether the initiating call module was called by a call instruction by inspecting the byte value at the position of the return address of the initiating call module minus an opcode format specific offset. The byte value found at the position of the return address of the initiating call module minus an opcode format specific offset is then compared with the call instruction opcode byte value associated with the opcode format. According to one embodiment of the present invention, the process is repeated for each known opcode format, opcode byte value, and opcode format specific offset associated with a call instruction.

FIGS. 4A and 4B are a flow diagram of one embodiment of WAS CALL MODULE CALLED? OPERATION 210 of host computer process 200 of FIG. 2 in accordance with one embodiment of the present invention. Referring now to FIGS. 2, 4A and 4B together, from an ENTER OPERATION 401 (and from STALL CALL OPERATION 208 of FIG. 2), flow moves to WAS CALL MODULE CALLED? OPERATION 210 and DEREFERENCE OF RETURN ADDRESS SUCESSFUL? OPERATION 402.

At DEREFERENCE OF RETURN ADDRESS SUCESSFUL? OPERATION 402 a dereference of the return address from the prologue hook is attempted. If the dereference is successful, then the present return address may be a valid address and flow moves to OFFSETS FOUND AT RETURN ADDRESS POSITION MINUS FOUR? OPERATION 403. If, on the other hand, a dereference of the return address is not successful, according to one embodiment of the invention, the call module, and the call to the critical OS function from the call module, are considered suspect and the method of the invention further includes taking action to protect the computer system as flow moves through 416 to KNOWN FALSE POSITIVE? OPERATION 216 (or directly to a TAKE PROTECTIVE ACTION OPERATION 218, if KNOWN FALSE POSITIVE? OPERATION 216 is not performed).

According to one embodiment of the present invention, if a dereference of the return address is successful at DEREFERENCE OF RETURN ADDRESS SUCESSFUL? OPERATION 402, flow moves to OFFSETS FOUND AT RETURN ADDRESS POSITION MINUS FOUR? OPERATION 403.

At OFFSETS FOUND AT RETURN ADDRESS POSITION MINUS FOUR? OPERATION 403, the code page for the initiating call module is inspected at the position of the return address of the initiating call module minus four bytes for offsets, also called simply ReturnAddress-4. Offsets at ReturnAddress-4 are found for a specific address mode of the call function only if the call module has been called by a FF02-FF03 instruction. Consequently, according to this embodiment of the invention, if offsets at ReturnAddress-4 are found at OFFSETS FOUND AT RETURN ADDRESS POSITION MINUS FOUR? OPERATION 403, flow moves through 405A to 405B and CALL OPCODE VALUE AT RETURN ADDRESS POSITION MINUS FIRST OPCODE FORMAT OFFSET? OPERATION 404 of FIG. 4B. If, on the other hand, offsets at ReturnAddress-4 are not found at OFFSETS FOUND AT RETURN ADDRESS POSITION MINUS FOUR? OPERATION 403, the result is considered negative, the initiating call module is considered suspect, and flow moves through 416 to KNOWN FALSE POSITIVE? OPERATION 216 (or directly to a TAKE PROTECTIVE ACTION OPERATION 218, if KNOWN FALSE POSITIVE? OPERATION 216 is not performed).

According to one embodiment of the present invention, if offsets at ReturnAddress-4 are found at OFFSETS FOUND AT RETURN ADDRESS POSITION MINUS FOUR? OPERATION 403, flow moves through 405A to 405B to CALL OPCODE VALUE AT RETURN ADDRESS POSITION MINUS FIRST OPCODE FORMAT OFFSET? OPERATION 404 of FIG. 4B. At CALL OPCODE VALUE AT RETURN ADDRESS POSITION MINUS FIRST OPCODE FORMAT OFFSET? OPERATION 404 the byte value at the position of the return address of the initiating call module minus a first opcode format specific offset is examined to determine whether the initiating call module has been called by the call instruction opcode byte value associated with the first opcode format. If the call instruction opcode byte value associated with the first opcode format is found at the position of the return address of the initiating call module minus the first opcode format specific offset, then the test is considered indeterminate and flow moves through 412 in FIG. 4B to ALLOW CALL TO PROCEED OPERATION 212 in FIG. 2.

The test at CALL OPCODE VALUE AT RETURN ADDRESS POSITION MINUS FIRST OPCODE FORMAT OFFSET? OPERATION 404 is considered indeterminate if the call instruction opcode byte value associated with the first opcode format is found at the position of the return address of the initiating call module minus the first opcode format specific offset because of the possibility of "false positive" results. In this instance, a "false positive" can result if the byte value at the position of the return address of the initiating call module minus the first opcode format specific offset is, by coincidence, the call instruction opcode byte value. Consequently, the call instruction opcode byte value associated with the first opcode format being found at the position of the return address minus the first opcode format specific offset is considered an indeterminate result.

On the other hand, if at CALL OPCODE VALUE AT RETURN ADDRESS POSITION MINUS FIRST OPCODE FORMAT OFFSET? OPERATION 404 the call instruction opcode byte value associated with the first opcode format is not found at the position of the return address minus the first opcode format specific offset, the result is considered negative and flow moves to CALL OPCODE VALUE AT RETURN ADDRESS POSITION MINUS SECOND OPCODE FORMAT OFFSET? OPERATION 406.

As a specific example, in one embodiment of the invention, the first opcode format is the E8 format and the addressing mode is such that the call instruction opcode byte value (byte value E8) is followed by a 1-byte offset and then the four byte return address. In this example, the first opcode format specific offset is five bytes and the position of the return address minus five bytes is checked for the call instruction opcode byte value E8. If, in this specific example, the byte value E8 is found at the position of the return address minus five bytes, the test at CALL OPCODE VALUE AT RETURN ADDRESS POSITION MINUS FIRST OPCODE FORMAT OFFSET? OPERATION 404 is considered indeterminate because of the possibility of "false positive" results. On the other hand, if at CALL OPCODE VALUE AT RETURN ADDRESS POSITION MINUS FIRST OPCODE FORMAT OFFSET? OPERATION 404 the opcode byte value E8 is not found at the position of the return address minus five bytes, the result is considered negative and flow moves to CALL OPCODE VALUE AT RETURN ADDRESS POSITION MINUS SECOND OPCODE FORMAT OFFSET? OPERATION 406.

At CALL OPCODE VALUE AT RETURN ADDRESS POSITION MINUS SECOND OPCODE FORMAT OFFSET? OPERATION 406 the position of the return address of the initiating call module minus a second opcode format specific offset is examined to determine whether the initiating call module has been called by the call instruction opcode byte value associated with a second opcode format. If the call instruction opcode byte value associated with the second opcode format is found at the position of the return address minus the second opcode format specific offset, then the test is considered indeterminate and flow moves through 412 in FIG. 4 to ALLOW CALL TO PROCEED OPERATION 212 in FIG. 2.

As with CALL OPCODE VALUE AT RETURN ADDRESS POSITION MINUS FIRST OPCODE FORMAT OFFSET? OPERATION 404, the test at CALL OPCODE VALUE AT RETURN ADDRESS POSITION MINUS SECOND OPCODE FORMAT OFFSET? OPERATION 406 is considered indeterminate if the call instruction opcode byte value associated with the second opcode format is found at the position of the return address minus the second opcode format specific offset because of the possibility of "false positive" results. On the other hand, if at CALL OPCODE VALUE AT RETURN ADDRESS POSITION MINUS SECOND OPCODE FORMAT OFFSET? OPERATION 406 the call instruction opcode byte value associated with the second opcode format is not found at the position of the return address minus the second opcode format specific offset, the result is considered negative and flow moves to CALL OPCODE VALUE AT RETURN ADDRESS POSITION MINUS THIRD OPCODE FORMAT OFFSET? OPERATION 408.

As a specific example, in one embodiment of the invention, the second opcode format is the FF02/FF03 format and the addressing mode is such that the call instruction opcode byte value (byte value FF) is followed directly by the four byte return address. In this example, the first opcode format specific offset is six bytes and the position of the return address minus six bytes is checked for the call instruction opcode byte value FF. If, in this specific example, the byte value FF is found at the position of the return address minus six bytes, the test at CALL OPCODE VALUE AT RETURN ADDRESS POSITION MINUS SECOND OPCODE FORMAT OFFSET? OPERATION 406 is considered indeterminate because of the possibility of "false positive" results. On the other hand, if at CALL OPCODE VALUE AT RETURN ADDRESS POSITION MINUS SECOND OPCODE FORMAT OFFSET? OPERATION 406 the opcode byte value FF03 is not found at the position of the return address minus six bytes, the result is considered negative and flow moves to CALL OPCODE VALUE AT RETURN ADDRESS POSITION MINUS THIRD OPCODE FORMAT OFFSET? OPERATION 408.

At CALL OPCODE VALUE AT RETURN ADDRESS POSITION MINUS THIRD OPCODE FORMAT OFFSET? OPERATION 408 the position of the return address of the initiating call module minus a third opcode format specific offset is examined to determine whether the initiating call module has been called by the call instruction opcode byte value associated with a third opcode format. If the call instruction opcode byte value associated with the third opcode format is found at the position of the return address minus the third opcode format specific offset, then the test is considered indeterminate and flow moves through 412 in FIG. 4 to ALLOW CALL TO PROCEED OPERATION 212 in FIG. 2.

As with CALL OPCODE VALUE AT RETURN ADDRESS POSITION MINUS FIRST OPCODE FORMAT OFFSET? OPERATION 404, the test at CALL OPCODE VALUE AT RETURN ADDRESS POSITION MINUS THIRD OPCODE FORMAT OFFSET? OPERATION 408 is considered indeterminate if the call instruction opcode byte value associated with the third opcode format is found at the position of the return address minus the third opcode format specific offset because of the possibility of "false positive" results. On the other hand, if at CALL OPCODE VALUE AT RETURN ADDRESS POSITION MINUS THIRD OPCODE FORMAT OFFSET? OPERATION 408 the call instruction opcode byte value associated with the third opcode format is not found at the position of the return address minus the third opcode format specific offset, the result is considered negative and flow moves to the next CALL OPCODE VALUE AT RETURN ADDRESS POSITION MINUS AN OPCODE FORMAT OFFSET? OPERATION (not shown).

According to one embodiment of the invention, the process described above is repeated for each call instruction opcode byte value, opcode format, and opcode format specific offset, associated with a call instruction, up to the "N" known opcode formats associated with a call instruction. At CALL OPCODE VALUE AT RETURN ADDRESS POSITION MINUS NTH OPCODE FORMAT OFFSET? OPERATION 410 the position of the return address of the initiating call module minus an Nth opcode format specific offset is examined to determine whether the initiating call module has been called by the call instruction opcode byte value associated with the Nth opcode format. If the call instruction opcode byte value associated with the Nth opcode format is found at the position of the return address minus the Nth opcode format specific offset and addressing mode, then the test is considered indeterminate and flow moves through 412 in FIG. 4 to ALLOW CALL TO PROCEED OPERATION 212 in FIG. 2.

As with CALL OPCODE VALUE AT RETURN ADDRESS POSITION MINUS FIRST OPCODE FORMAT OFFSET? OPERATION 404, the test at CALL OPCODE VALUE AT RETURN ADDRESS POSITION MINUS NTH OPCODE FORMAT OFFSET? OPERATION 410 is considered indeterminate if the call instruction opcode byte value associated with the Nth opcode format is found at the position of the return address minus the Nth opcode format specific offset because of the possibility of "false positive" results. On the other hand, if at CALL OPCODE VALUE AT RETURN ADDRESS POSITION MINUS NTH OPCODE FORMAT OFFSET? OPERATION 410 the call instruction opcode byte value associated with the Nth opcode format is not found at the position of the return address minus the Nth opcode format specific offset, the result is considered negative and flow moves through 414 in FIG. 4 to KNOWN FALSE POSITIVE? OPERATION 216 (or directly to a TAKE PROTECTIVE ACTION OPERATION 218, if KNOWN FALSE POSITIVE? OPERATION 216 is not performed), as discussed above with respect to FIG. 2.

As discussed above, according to one embodiment of the present invention, if the position of the return address of the initiating call module minus any of the opcode format specific offsets tested in CALL OPCODE VALUE AT RETURN ADDRESS POSITION MINUS FIRST OPCODE FORMAT OFFSET? OPERATION 404 through CALL OPCODE VALUE AT RETURN ADDRESS POSITION MINUS NTH OPCODE FORMAT OFFSET? OPERATION 410 produces the proper call instruction opcode byte value, then the test is considered indeterminate and flow moves to ALLOW CALL TO PROCEED OPERATION 212. On the other hand, if the position of the return address of the initiating call module minus all of the known opcode specific relative offsets in CALL OPCODE VALUE AT RETURN ADDRESS POSITION MINUS FIRST OPCODE FORMAT OFFSET? OPERATION 404 through CALL OPCODE VALUE AT RETURN ADDRESS POSITION MINUS NTH OPCODE FORMAT OFFSET? OPERATION 410 fails to produce a proper call instruction opcode byte value, then, according to one embodiment of the invention, it is determined that the initiating call module was not called by a call instruction and the method further includes TAKE PROTECTIVE ACTION OPERATION 218. Consequently, the call to a critical OS function is terminated, the critical OS function is prevented from being executed, remote access is denied, and unauthorized access by malicious hackers is prevented.

As discussed above, the present invention makes use of the fact that non-malicious call modules, such as APIs, making critical OS function calls are typically called by a call instruction, while, in contrast, a RLIBC attack typically uses call modules that are jumped to, returned to, or invoked by some means other than a call instruction. According to the present invention, the method includes stalling a call to critical OS function and checking to ensure that the call module making the call to the critical OS function was called by a call instruction. If it is determined that the function was not called by a call instruction, the method further includes taking protective action to protect the computer system.

Referring again to FIG. 1, in one embodiment of the invention, Return-to-LIBC attack blocking application 106 is in computer memory 114. As used herein, a computer memory refers to a volatile memory, a non-volatile memory, or a combination of the two.

Although Return-to-LIBC attack blocking application 106 is referred to as an application, this is illustrative only. Return-to-LIBC attack blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, Return-to-LIBC attack blocking application 106 is implemented as a system level, e.g., kernel mode driver.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, Return-to-LIBC attack blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the Return-to-LIBC attack blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the Return-to-LIBC attack blocking functionality in accordance with one embodiment of present invention can be implemented in a wide variety of computer system configurations. In addition, the Return-to-LIBC attack blocking functionality could be stored as different modules in memories of different devices. For example, Return-to-LIBC attack blocking application 106 could initially be stored in server system 130, and then as necessary, a portion of Return-to-LIBC attack blocking application 106 could be transferred to host computer system 102 and executed on host computer system 102. Consequently, part of the Return-to-LIBC attack blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, Return-to-LIBC attack blocking application 106 is stored in memory 136 of server system 130. Return-to-LIBC attack blocking application 106 is transferred over network 124 to memory 114 in host computer system 102. In this embodiment, network interface 138 and I/O interface 110 would include analog modems, digital modems, or a network interface card. If modems are used, network 124 includes a communications network, and Return-to-LIBC attack blocking application 106 is downloaded via the communications network.

This disclosure provides exemplary embodiments of the present invention. The scope of the present invention is not limited by these exemplary embodiments. For example, for illustrative purposes, specific operations, and flow of operations, were described above and set forth in the FIG. s. However, those of skill in the art will readily recognize that the operations, and flow of operations, can be varied to meet the specific user's needs and to accommodate differing implementations of the invention.

In addition, various opcode formats such E8 and FF02/FF03 were used above for illustrative purposes. However, those of skill in the art will readily recognize that the embodiments of present invention used for illustrative purposes above can be modified to accommodate any opcode format and addressing modes, either in use as of filing, or as developed in the future, without deviating from the spirit of the invention or the scope of the included claims.

Consequently, numerous variations, whether explicitly provided for by the specification or implied by the specification or not, may be implemented by one of skill in the art in view of this disclosure.

What is claimed is:

1. A method comprising:
    stalling a call to a critical operating system (OS) function; and
    determining whether a call module making said call to a critical operating system (OS) function was called by a call instruction, said determining whether said call module making said call to a critical operating system (OS) function was called by a call instruction comprising:
    examining a position of a return address of said call module making said call to a critical operating system (OS) function minus an opcode format specific offset associated with an opcode format to determine whether a call instruction opcode byte value associated with said opcode format is present;
    if said call instruction opcode byte value associated with said opcode format is present at said position of a return address of said call module making said call to a critical operating system (OS) function minus said opcode format specific offset, determining that said call module making said call to a critical operating system (OS) function may have been called by said call instruction opcode byte value associated with said opcode format; and
    if said call instruction opcode byte value associated with said opcode format is not present at said position of a return address of said call module making said call to a critical operating system (OS) function minus said opcode format specific offset, determining that said call module making said call to a critical operating system (OS) function has not been called by said call instruction opcode byte value associated with said opcode format.

2. The method of claim 1 further comprising;
    for each opcode format of a plurality of N opcode formats associated with a call instruction:
    examining a position of a return address of said call module making said call to a critical operating system (OS) function minus an opcode format specific offset associated with said each opcode format to determine whether or not a call instruction opcode byte value associated with said each opcode format is present;
    if said call instruction opcode byte value associated with any of said each opcode format is present at said position of a return address of said call module making said call to a critical operating system (OS) function minus said opcode format specific offset associated with said each opcode format, determining that said call module making said call to a critical operating system (OS) function may have been called by a call instruction; and
    if said call instruction opcode byte value associated with any of said each opcode format is not present at said position of a return address of said call module making said call to a critical operating system (OS) function minus said opcode format specific offset associated with said each opcode format, determining that said call module making said call to a critical operating system (OS) function has not been called by a call instruction.

3. The method of claim 2 further comprising taking protective action to protect a computer system upon a determination that said call module making said call to a critical operating system (OS) function was not called by a call instruction.

4. The method of claim 3 wherein said taking protective action comprises terminating said call to a critical operating system (OS) function.

5. The method of claim 3 wherein said taking protective action comprises terminating said call module making said call to a critical operating system (OS) function.

6. The method of claim 3 wherein said taking protective action comprises terminating a parent application comprising said call module making said call to a critical operating system (OS) function.

7. A method comprising:
    stalling a call to a critical operating system (OS) function; and
    determining whether a call module making said call to a critical operating system (OS) function was called by a call instruction, said determining whether said call module making said call to a critical operating system (OS) function was called by a call instruction comprising:
    inspecting a position of a return address of said call module making said call to a critical operating system (OS) function minus four bytes in a code page of said call module making said call to a critical operating system (OS) function for offsets;
    if offsets are not found at said position of a return address of said call module making said call to a critical operating system (OS) function minus four bytes in said code page of said call module making said call to a critical operating system (OS) function, determining that said call module making said call to a critical operating system (OS) function was not called by a call instruction; if offsets are found at said position of a return address of said call module making said call to a critical operating system (OS) function minus four bytes in said code page of said call module making said call to a critical operating system (OS) function, said method further comprising:

examining a position of a return address of said call module making said call to a critical operating system (OS) function minus an opcode format specific offset associated with an opcode format to determine whether a call instruction opcode byte value associated with said opcode format is present;

if said call instruction opcode byte value associated with said opcode format is present at said position of a return address of said call module making said call to a critical operating system (OS) function minus said opcode format specific offset, determining that said call module making said call to a critical operating system (OS) function may have been called by said call instruction opcode byte value associated with said opcode format; and if said call instruction opcode byte value associated with said opcode format is not present at said position of a return address of said call module making said call to a critical operating system (OS) function minus said opcode format specific offset, determining that said call module making said call to a critical operating system (OS) function has not been called by said call instruction opcode byte value associated with said opcode format.

8. The method of claim 7 wherein if offsets are found at said position of a return address of said call module making said call to a critical operating system (OS) function minus four bytes in said code page of said call module making said call to a critical operating system (OS) function, said method further comprising:

for each opcode format of a plurality of N opcode formats associated with a call instruction:

examining a position of a return address of said call module making said call to a critical operating system (OS) function minus an opcode format specific offset associated with said each opcode format to determine whether or not a call instruction opcode byte value associated with said each opcode format is present;

if said call instruction opcode byte value associated with any of said each opcode format is present at said position of a return address of said call module making said call to a critical operating system (OS) function minus said opcode format specific offset associated with said each opcode format, determining that said call module making said call to a critical operating system (OS) function may have been called by a call instruction; and if said call instruction opcode byte value associated with any of said each opcode format is not present at said position of a return address of said call module making said call to a critical operating system (OS) function minus said opcode format specific offset associated with said each opcode format, determining that said call module making said call to a critical operating system (OS) function has not been called by a call instruction.

9. The method of claim 8 further comprising allowing said call to a critical operating system (OS) function to proceed upon a determination that said call module making said call to a critical operating system (OS) function was called by a call instruction.

10. The method of claim 8 further comprising taking protective action to protect a computer system upon a determination that said call module making said call to a critical operating system (OS) function was not called by a call instruction.

11. The method of claim 10 wherein said taking protective action comprises terminating said call to a critical operating system (OS) function.

12. The method of claim 10 wherein said taking protective action comprises terminating said call module making said call to a critical operating system (OS) function.

13. The method of claim 10 wherein said taking protective action comprises terminating a parent application comprising said call module making said call to a critical operating system (OS) function.

\* \* \* \* \*